(12) United States Patent
Rao et al.

(10) Patent No.: US 7,663,517 B1
(45) Date of Patent: Feb. 16, 2010

(54) ACCURATE HARDWARE POWER OK (POK) GENERATION METHODOLOGY FOR PROCESSORS WITH VARYING CORE VOLTAGE REQUIREMENTS

(75) Inventors: Deepak Rao, Fremont, CA (US); Han Y. Ko, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 320 days.

(21) Appl. No.: 11/427,310

(22) Filed: Jun. 28, 2006

(51) Int. Cl.
*H03M 1/00* (2006.01)
(52) U.S. Cl. ..................... 341/126; 341/141
(58) Field of Classification Search ............... 323/312, 323/313, 241, 322; 341/141, 126
See application file for complete search history.

(56) References Cited

U.S. PATENT DOCUMENTS

| | | | |
|---|---|---|---|
| 5,841,996 A * | 11/1998 | Nolan et al. ............... 710/305 |
| 6,047,380 A * | 4/2000 | Nolan et al. ............... 713/324 |
| 6,888,482 B1 * | 5/2005 | Hertle ........................ 341/120 |
| 7,400,283 B1 * | 7/2008 | Zhu ............................ 341/141 |
| 2003/0102994 A1 * | 6/2003 | Stimmann .................. 341/139 |
| 2005/0052200 A1 * | 3/2005 | Nguyen et al. ............. 326/30 |
| 2007/0139244 A1 * | 6/2007 | Kuhn .......................... 341/155 |

OTHER PUBLICATIONS

Dallas Semiconductor, MAXIM, "MAX4634 Fast, Low-Voltage, 4 Ohm, 4-Channel CMOS Analog Multiplexer," http://www.maxim-ic.com/quick_view2.cfm/qv_pk/2254, Copyright 2006, p. 1-2.
Dallas Semiconductor, MAXIM, MAX705, MAX706, MAX707, MAX708, MAX813, MAX813L, "Low-Cost Reset + Watchgod ICs," http://www.maxim-ic.com/quick_view2.cfm/qv_pk/1151, Copyright 2006, pp. 1-2.
Miller et al., "Precision voltage references," Texas Instruments, Analog Applications Journal, Analog and Mixed-Signal Products, Nov. 1999, pp. 1-5.

* cited by examiner

*Primary Examiner*—Bao Q. Vu
*Assistant Examiner*—Nguyen Tran
(74) *Attorney, Agent, or Firm*—Martine Penilla & Gencarella LLP

(57) ABSTRACT

A method for configuring a circuit for providing a power OK (POK) signal is described. The method includes identifying a voltage range and voltage interval, dividing the voltage range into a plurality of segments, selecting a reference voltage for each segment, and selecting resistor values for a plurality of voltage dividers for dividing an output voltage from a precision voltage reference into each of the reference voltages. A power OK signal generator and method for generating a power OK signal are also described.

11 Claims, 5 Drawing Sheets

FIG. 4

| DAC4 | DAC3 | DAC2 | DAC1 | DAC0 | VDD | V'Ref (Volts) | Calculated Resistance Value R = (250/V'Ref) -100 (Ohm) | Actual Resistance Value (E-96) (Ohm) | VRef (volts) | Segment ID |
|---|---|---|---|---|---|---|---|---|---|---|
| 0 | 0 | 0 | 0 | 0 | 1.550 | | | | | |
| 0 | 0 | 0 | 0 | 1 | 1.525 | | | | | |
| 0 | 0 | 0 | 1 | 0 | 1.500 | | | | | |
| 0 | 0 | 0 | 1 | 1 | 1.475 | | | | | |
| 0 | 0 | 1 | 0 | 0 | 1.450 | 1.075 | 132.558 | R1=133 | 1.073 | #1 |
| 0 | 0 | 1 | 0 | 1 | 1.425 | | | | | |
| 0 | 0 | 1 | 1 | 0 | 1.400 | | | | | |
| 0 | 0 | 1 | 1 | 1 | 1.375 | | | | | |
| 0 | 1 | 0 | 0 | 0 | 1.350 | | | | | |
| 0 | 1 | 0 | 0 | 1 | 1.325 | | | | | |
| 0 | 1 | 0 | 1 | 0 | 1.300 | | | | | |
| 0 | 1 | 0 | 1 | 1 | 1.275 | 0.875 | 185.714 | R2=187 | 0.871 | #2 |
| 0 | 1 | 1 | 0 | 0 | 1.250 | | | | | |
| 0 | 1 | 1 | 0 | 1 | 1.225 | | | | | |
| 0 | 1 | 1 | 1 | 0 | 1.200 | | | | | |
| 0 | 1 | 1 | 1 | 1 | 1.175 | | | | | |
| 1 | 0 | 0 | 0 | 0 | 1.150 | | | | | |
| 1 | 0 | 0 | 0 | 1 | 1.125 | | | | | |
| 1 | 0 | 0 | 1 | 0 | 1.100 | | | | | |
| 1 | 0 | 0 | 1 | 1 | 1.075 | 0.675 | 270.370 | R3=267 | 0.681 | #3 |
| 1 | 0 | 1 | 0 | 0 | 1.050 | | | | | |
| 1 | 0 | 1 | 0 | 1 | 1.025 | | | | | |
| 1 | 0 | 1 | 1 | 0 | 1.000 | | | | | |
| 1 | 0 | 1 | 1 | 1 | 0.975 | | | | | |
| 1 | 1 | 0 | 0 | 0 | 0.950 | | | | | |
| 1 | 1 | 0 | 0 | 1 | 0.925 | | | | | |
| 1 | 1 | 0 | 1 | 0 | 0.900 | | | | | |
| 1 | 1 | 0 | 1 | 1 | 0.875 | 0.475 | 426.316 | R4=422 | 0.479 | #4 |
| 1 | 1 | 1 | 0 | 0 | 0.850 | | | | | |
| 1 | 1 | 1 | 0 | 1 | 0.825 | | | | | |
| 1 | 1 | 1 | 1 | 0 | 0.800 | | | | | |
| 1 | 1 | 1 | 1 | 1 | 0.775 | | | | | |

ACCURATE HARDWARE POWER OK (POK) GENERATION METHODOLOGY FOR PROCESSORS WITH VARYING CORE VOLTAGE REQUIREMENTS

BACKGROUND

It is common for manufacturers of computer processors to specify that current be supplied at a plurality of voltages. For example, a computer processor may require voltage at 3.3 Volts for external I/O circuits, and a smaller second voltage amount, referred to as the core voltage, for core circuitry. Thus, a processor can communicate with the motherboard at one voltage, and operate its internal circuitry at the reduced voltage.

On starting up a computer system, the core voltage supplied by the motherboard ramps up from zero when the power is switched on and at some points reaches a minimum acceptable voltage level close to the core voltage specified by the manufacturer. It is important that the processor not begin operating until the power has reached this minimum acceptable voltage level. Therefore, to determine when the minimum acceptable voltage level is reached, a "Power OK" (POK) signal is generated. Typically, the POK signal will be asserted when the core voltage reaches the minimum acceptable voltage, thereby indicated to the processor that it is ok to begin operation.

As computer processors are manufactured with smaller and smaller transistors, conductors, and other features, the problem of voltage leakage across closed transistor gates and cross talk has been met by taking a variety of measures. One significant measure taken by processor designers and manufacturers is the increasingly lowered core voltage. With reduced voltage, less current leaks across the closed transistors, which results in more efficient processors that dissipate less power in the form of heat.

The continuing reduction of core voltage requirements has caused a problem for circuit board manufacturers who provide circuit boards supporting a variety of processors, and therefore a variety of core voltages. With the wide range of core voltage requirements of older and newer processors, and with the expectation of even further reduction in core voltages, it has been necessary to provide core voltages that vary from, for example, 0.775 Volts to 1.550 Volts with increments of as little as 0.025 Volts.

To provide an accurate POK signal with such a broad range of core voltages, designers have resorted to dividing up the range of core voltages into segments, e.g., four segments, each having a corresponding reference voltage generated using a distinct voltage divider. Each voltage divider supplies a specified reference voltage output between two resistors connected in series between a main 3.3 Volt supply and ground. The reference voltage corresponding to the segment in which the core voltage lies is selected using a multiplexer. The selected reference voltage is then compared with the core voltage using a comparator, which gives a logic high when the core voltage exceeds the selected reference voltage. The output of the comparator is passed through a delay circuit to delay by a selected delay amount, e.g., 140 to 280 milliseconds. The output of the delay circuit is the POK signal. In one embodiment, the POK signal changes to a logic high after the comparator output changes with a 200 millisecond delay.

A problem with previous POK signal generators has been a lack of accuracy that has been traced to the initial voltage input. Depending on the main power supply, it is possible that during system startup, voltages in the main 3.3 Volt rail will fluctuate somewhat due to high current draws from various components such as main memory. Since the reference voltages are taken by dividing the main 3.3 Volt supply, the reference voltage will also fluctuate, which could adversely affect the proper timing of the POK signal, and could potentially lead to errors.

There therefore exists a need to more reliably determine when the core voltage reaches the target core voltage specified by the processor manufacturer.

SUMMARY

Broadly speaking, the present invention fills these needs by providing a Power OK (POK) signal generator with support for a broad range of core voltages.

It should be appreciated that the present invention can be implemented in numerous ways, including as a process, an apparatus, a system, a device, or a method. Several inventive embodiments of the present invention are described below.

In one embodiment, a power OK (POK) generator is provided. The POK generator includes a precision reference source, a plurality of voltage dividers, a multiplexer, a comparator, and an output stage circuit. The precision reference source generates current at a precision reference voltage. Each of the voltage dividers generates a reference voltage from the precision reference source. The multiplexer receives each of the reference voltage and selects one of the them based on select signals, which are derived from a digital-to-analog converter (DAC) code. The DAC code identifies a target core voltage. The comparator receives the reference voltage selected by the multiplexer and the core voltage provided by a core voltage generator, and outputs power fail input (PFI) signal that indicates whether the core voltage is greater than the selected reference voltage. The output stage circuit receives the PFI signal and generates a power OK (POK) signal which is asserted after a predetermined delay from the time that the PFI signal changes state from the logic low to logic high.

In another embodiment, a method for providing a power OK (POK) signal is provided. The method includes generating current at a precision reference voltage using a precision reference source, providing a plurality of reference voltages using a series of voltage dividers, and selecting one of the reference voltages based on one or more select signals. The select signals are derived from a digital-to-analog converter (DAC) code, which identifies a target core voltage. A power fail input (PFI) signal is generated which indicates whether the core voltage is greater than the selected reference voltage. Finally, The power OK (POK) signal is generated, the POK signal indicating, after predetermined delay, that the PFI signal has indicated that the core voltage has passed and exceeds the selected reference voltage.

In yet another embodiment, a method for configuring a circuit for providing a power OK (POK) signal is provided. The method includes identifying a voltage range and voltage interval, dividing the voltage range into a plurality of segments, selecting reference voltages for each segment, and selecting resistor values for a plurality of voltage dividers. The voltage range is a range of core voltages and the voltage interval is a voltage difference between adjacent values of the core voltages within the voltage range. Each of the core voltages is assigned a unique digital to analog converter (DAC) code. Each segment of the voltage range contains a contiguous portion of the voltage range. The reference voltage is selected to be marginally less than the lowest core voltage in the segment corresponding to the reference voltage. The voltage dividers divide an output voltage from a precision voltage reference to yield reference voltages.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 3A shows a simplified schematic for an exemplary precision voltage reference circuit.

FIG. 4 shows a table illustrating by way of example how a core voltage range is divided into segments and how resistances a series of voltage dividers are determined.

FIG. 5 shows graph providing an exemplary voltage curve from power on.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1:
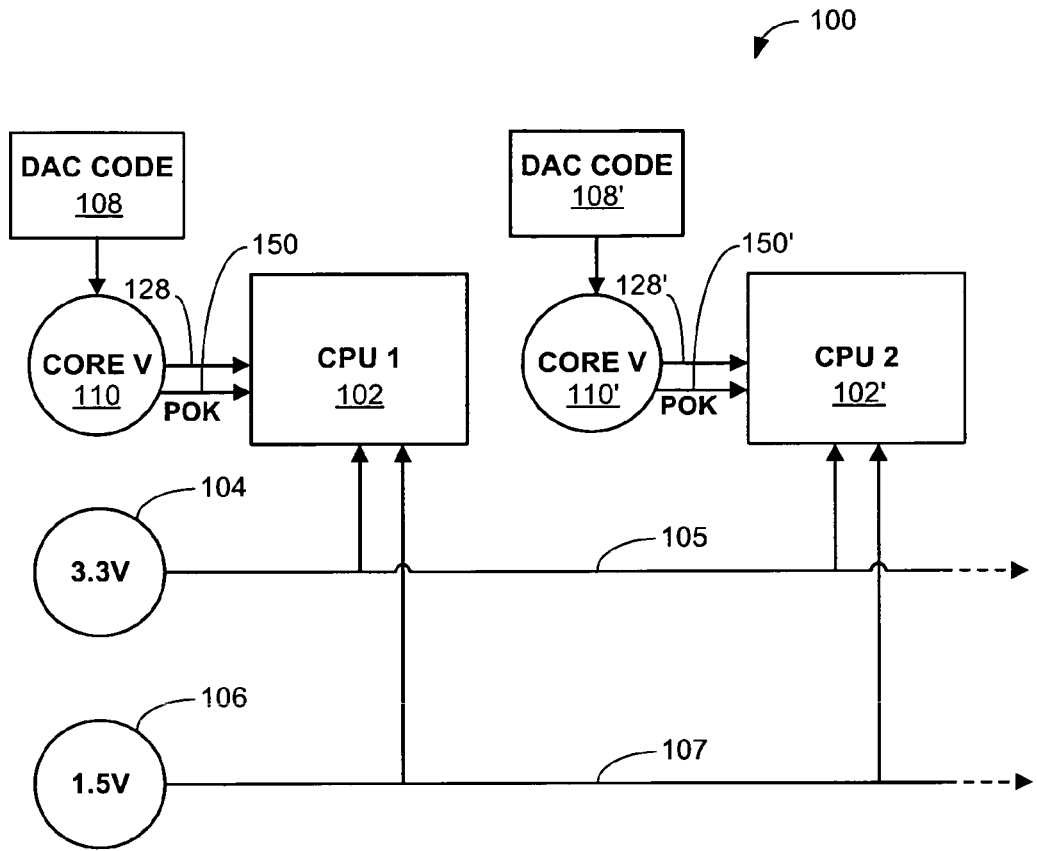
FIG. 1 shows a block diagram overview of power supply system.

FIG. 1 shows a block diagram overview of power supply system 100. System 100 is capable of supplying electricity for a plurality of processors 102, 102', only two of which are shown. A 3.3 Volt supply 104 supplies a first voltage rail 105, which may exist as a layer of conductive metal in the circuit board. A 1.5 Volt supply 106 supplies a second voltage rail 107, which also may exist as a layer of conductive metal in the circuit board. Each CPU 102, 102' draws current from first and second voltage rails 105, 107. In addition, each CPU 102, 102' receives current at a designated core voltage from corresponding core voltage sources 110, 110'. Each core voltage source 110, 110' supplies current at a core voltage according to a digital-to-analog converter (DAC) code 108, 108'. DAC code 108, 108' is programmable. Each value of DAC code 108, 108' represents a voltage amount according to a voltage table shown by way of example in FIG. 4. Referring briefly to DAC table 160 of FIG. 4, the first five columns 161-165 identify bits 4, 3, 2, 1, and 0 of the DAC code, respectively. Column 166 identifies $V_{DD}$, which shows exemplary core voltages corresponding to DAC codes specified in columns 161-165. Returning to FIG. 1, core voltage sources 110, 110' generate core voltage 128, 128' and power OK (POK) signal 150, 150', which indicates when core voltage 128, 128' is at a minimum reference voltage corresponding to the DAC code 108, 108'.

Figure 2:
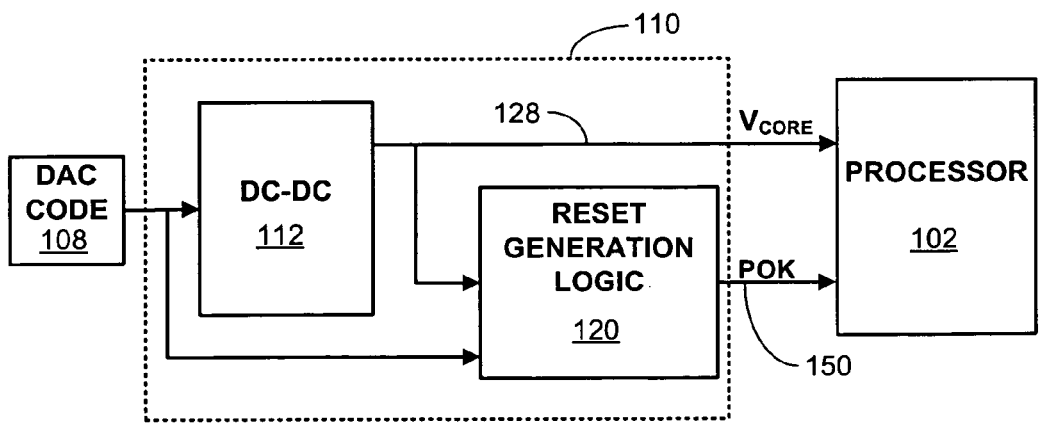
FIG. 2 shows an exemplary block diagram of core voltage source.

FIG. 2 shows an exemplary block diagram of core voltage source 110. Core voltage source 110 includes a DC-DC voltage converter 112 that generates core voltage 128 $V_{CORE}$, which is provided to processor 102. DC-DC voltage converter 112 is well known technology that is readily available. Therefore, there is no need to further describe voltage converter 112. Voltage source 110 additionally includes a reset generation logic 120 that receives core voltage 128 and DAC code 108 to provide a POK signal 150 to processor 102.

Figure 3:
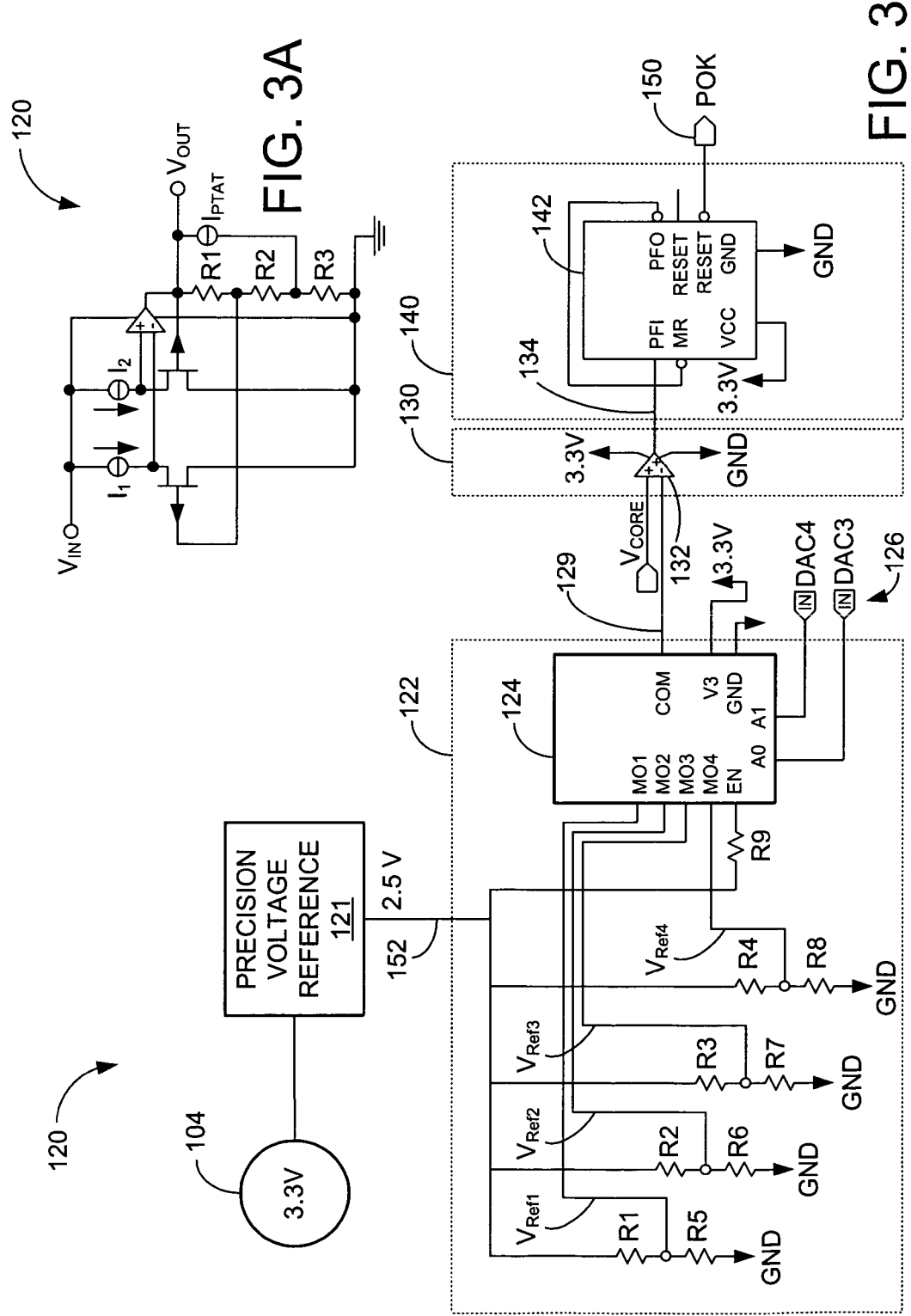
FIG. 3 shows an exemplary circuit for generating a POK signal.

FIG. 3 shows an exemplary circuit 120 having a precision reference source 121 that receives current at 3.3 volts from voltage source 104 via rail 105 (FIG. 1). The 3.3 Volt source is susceptible to fluctuation caused by varying loads, temperature changes, etc. In one embodiment, precision voltage reference 121 generates a steady 2.5 Volt output 152 although other voltage amounts are contemplated.

Precision voltage reference 121 may provide an operational amplifier ("op-amp") operating in closed loop mode with active circuitry for temperature compensation, and generally will provide a output voltage with an accuracy of about ±0.06%. FIG. 3A shows a simplified schematic for an exemplary precision voltage reference circuit 121, which is generally referred to as an XFET reference circuit. The XFET reference circuit includes two junction field-effect transistors (FETs), one of which has an extra channel implant to raise the pinch-off voltage. The pinch-off voltage difference is amplified and used to form the output voltage. The general equation is:

$$V_{OUT} = \Delta V_P \left( \frac{R1 + R2 + R3}{R1} \right) + (I_{PTAT})(R3)$$

where $\Delta V_P$ is the pinch-off voltage difference between the two FETs and $I_{PTAT}$ is the positive temperature coefficient correction current. Other types of precision voltage reference circuits, such as band-gap references and buried zener diode references are known and may similarly be used in conjunction with circuit 120 shown in FIG. 3.

Returning to FIG. 3, output 152 from precision reference source 121 is fed into voltage divider circuit 122 having a plurality of first resistors R1-R4 and a plurality of second resistors R5-R8. Resistors R1 to R8 are precision resistors such as resistors manufactured to 1% tolerance. In one embodiment, second resisters R5-R8 are arbitrarily selected to be 100 ohms, and first resistors R1-R4 are selected so that $V_{Ref1}$ through $V_{Ref4}$ are at predetermined levels. Resistor R9 is connected to an enabling signal input of multiplexer 124.

Table 160 shown in FIG. 4 shows how exemplary resistances for resistors R1-R4 are determined. Column 166 provides a list of 32 core voltages that can be provided by core voltage generator 110 (FIGS. 1, 2). This list is divided into four segments, numbered 1, 2, 3, and 4 as indicated in column 172. For each segment, a target reference voltage $V'_{Ref}$ shown in column 168, is selected to be marginally less than the lowest core voltage for the segment. By "marginally less," is meant that the target reference voltage be close to the lowest core voltage in the segment, but sufficiently less so as to provide a buffer to account for hysteresis and manufacturing tolerances. In the embodiment shown by way of example in FIG. 4, the target reference voltage is selected to be 300 mV offset less than the lowest core voltage. The offset may vary from one segment to another, e.g., with a smaller offset for segments having lower voltages.

A calculation is made in column 169 to determine the correct first resistor value for resistors R1-R4 (FIG. 3) corresponding to segments 1-4. The calculation is made in accordance with Ohm's Law. For example $R1=(R5)(V_T)/(V_{REF1}')-(R5)$, where $V_T$ is the voltage provided by precision voltage reference 121 (FIG. 3). This provides the precise resistance value to obtain the desired reference voltage. However, resistors are available only for discrete resistances. Thus, an actual standard resistor, listed in column 170 is selected from the Electronic Industries Alliance (EIA) series E-96 resistors that is closest to the calculated resistance of column 169. Applying Ohm's Law to the actual resistance amount yields the actual reference voltage $V_{Ref}$ shown in column 171.

Referring to FIG. 3, first resistors R1-R4 are selected as described above with reference to FIG. 4, thereby providing four reference voltages $V_{Ref1}$ through $V_{Ref4}$, which are fed into 4:1 multiplexer 124. The 4:1 multiplexer 124 can be any suitable multiplexer, such as the commercially available MAX4634 from Maxim Integrated Products, Inc. of Sunnyvale, Calif. To select the desired reference voltage, select signals 126 are drawn from the first two bits of DAC code 108 (FIG. 1) shown in columns 161 and 162 of table 160 in FIG. 4. It is also possible to derive select signals 126 in any convenient or necessary way, e.g., using logic gates, to transform DAC code 108 to select signals, where the segments do not correspond with significant digits of the DAC code. Reference voltage 129 is output from multiplexer 124.

Power fail input (PFI) signal generator subcircuit 130 has a comparator 132 that receives reference voltage 129 and core voltage 128 from core voltage generator 110 (FIGS. 1, 2). Comparator 132 generates a power fail input (PFI) signal 134, which is a high voltage (e.g., 3.3 volts) when core voltage 128 exceeds reference voltage 129 and a low voltage (ground) when core voltage 128 is less than reference voltage 129.

PFI signal 134 is input into the PFI signal input of supervisor circuit 142 of output stage 140. Supervisor circuit 142 asserts POK signal 150 after a 200 millisecond delay from the time PFI 129 changes from low voltage to high voltage. Supervisor circuits are generally commercially available. An exemplary supervisor circuit suitable for reset generation logic 120 is the MAX708 from Maxim Integrated Products, Inc. of Sunnyvale, Calif.

Figure 5:
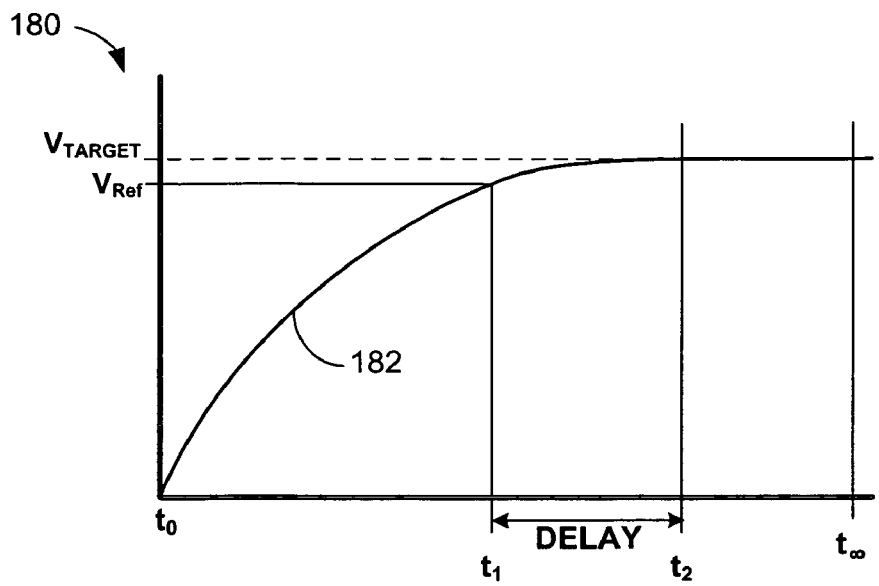

FIG. 5 shows graph 180 providing an exemplary voltage curve 182 from time $t_0$, or power on, to time $t_\infty$, which is the set point for core voltage $V_{CORE}$. Graph 180 illustrates the function of output stage 140 (FIG. 3). $V_{CORE}$ exceeds the reference voltage $V_{Ref}$ at time $t_1$, and approximately reaches target voltage $V_{TARGET}$ at some time before $t_2$. POK signal is asserted (is changed to logic high) at time $t_2$, which may be, for example, 200 milliseconds from time $t_1$. As can be seen, the delay function of supervisor circuit 142 (FIG. 4) allows for a lower reference voltage to be set, thereby preventing erroneous resets due to hysteresis and permits each reference voltage to support the range of core voltages within each segment.

Figure 6:
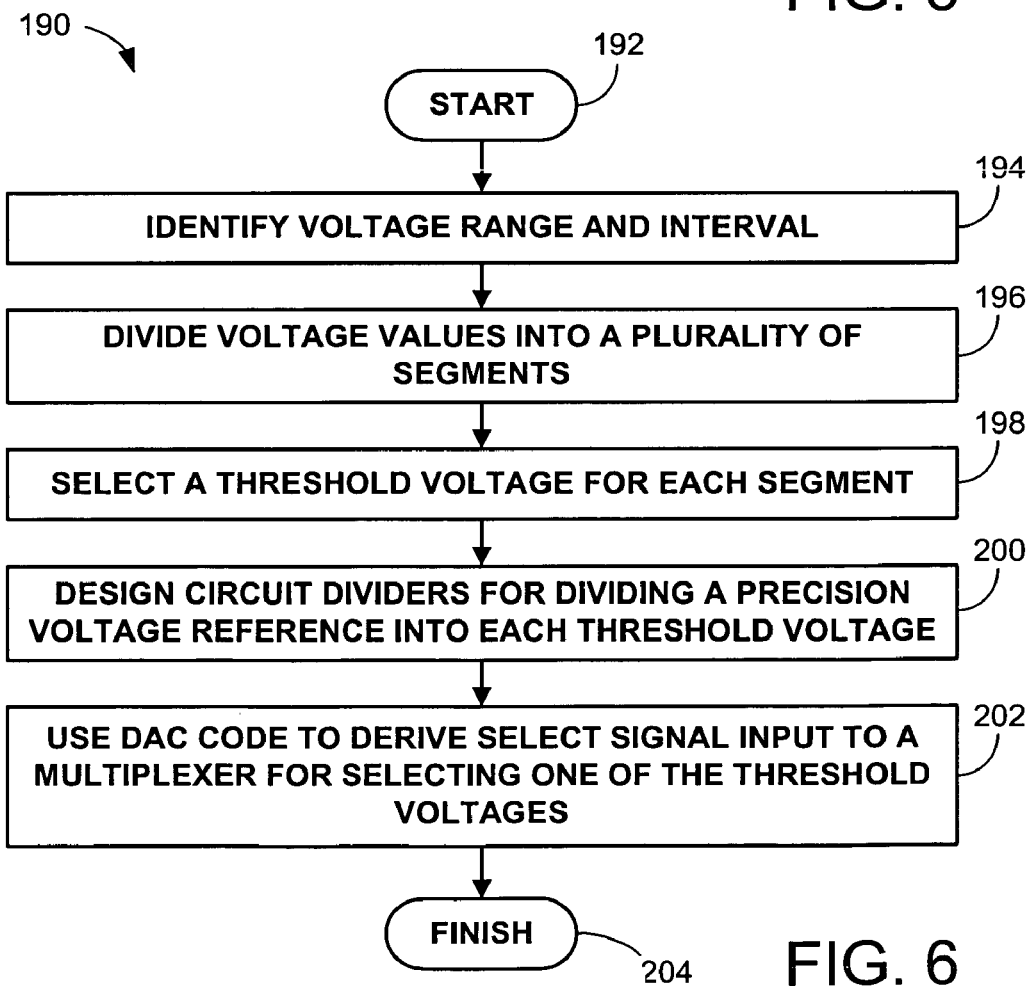
FIG. 6 shows a flowchart providing an exemplary procedure for configuring the circuit shown in FIG. 3

FIG. 6 shows a flowchart 190 providing an exemplary procedure for configuring circuit 120 using a chart as described above with reference to FIG. 4. The procedure begins as indicated by start block 192 and proceeds to operation 194 wherein a designed-for voltage range and interval is identified. In this case, the voltage range will depend on the models and corresponding core voltage requirements of microprocessors being supported by the circuit. For the example shown in FIG. 4, the voltage range extends from 0.775 V to 1.550 V with an interval of 0.025 V. Thus, the voltage range encompassed by circuit 120 supports 32 distinct voltages to satisfy a variety of processor core voltage requirements. Returning to FIG. 6, after identifying the voltage range and interval, the procedure flows to operation 196.

In operation 196, the voltage values are divided into a plurality of segments. The number of segments will depend upon the breadth of voltage ranges and the desired accuracy needed of the POK signal. In the example shown in table 160 of FIG. 4, the voltages are divided into four segments which are identified by the initial two bits of the DAC code, which correlates to columns 161 and 162 of table 160.

Returning to FIG. 6, the procedure flows then to operation 198 wherein a reference voltage is selected for each segment. In the example of FIG. 4, the threshold was selected to be 300 mV less than the lowest core voltage. The 300 mV buffer prevents a POK signal from toggling due to hysteresis, and provides a small buffer to account for manufacturing tolerances in resistor elements. After selecting the reference voltage, the procedure flows to operation 200 wherein circuit dividers are deigned for dividing the precision voltage reference into each reference voltage. Since resistors are typically available in discrete resistance amounts (Ohms) some approximation of the reference voltage may be necessary, as described above with reference to columns 169-171 in table 160 of FIG. 4. In operation 202, a multiplexer is configured with the reference voltages from the voltage dividers connected as selectable inputs, the inputs being selected based on the DAC code. It should be noted that, while circuit 120 of FIG. 3 conveniently receives the first two bits of the DAC code as select signals, the segments could be divided in any convenient or necessary way which may require that the DAC codes be processed by various logic gates as necessary for deriving appropriate select signals to select a reference voltage corresponding to the segment of the voltage range of the target core voltage identified by the DAC code. Output of the multiplexer is taken as the reference voltage which is input into comparator 132 (FIG. 3). Once the multiplexer is configured, the procedure ends as indicated by finish block 204.

Figure 7:
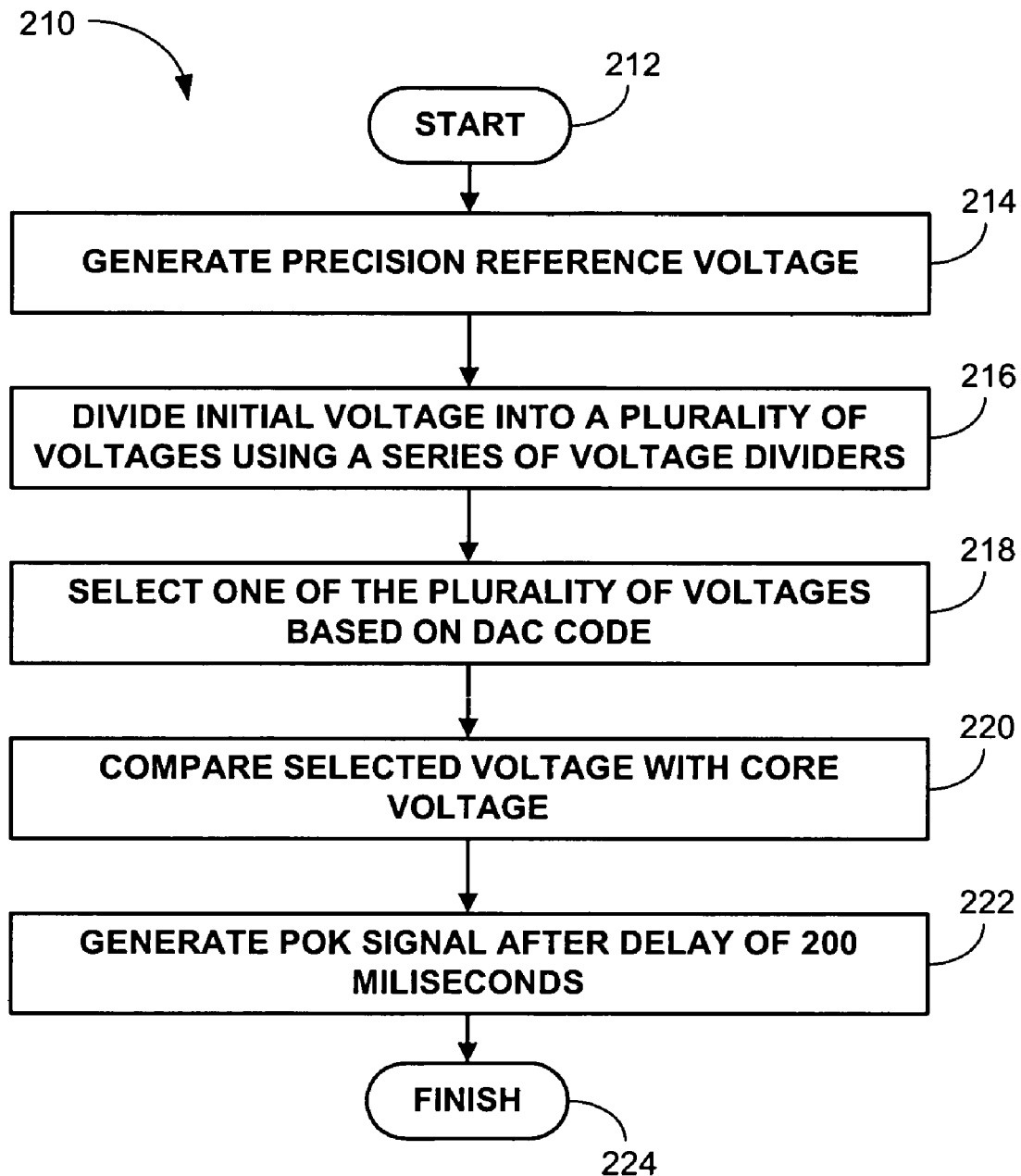
FIG. 7 shows a flow chart describing an exemplary procedure for generating a POK signal.

FIG. 7 shows a flow chart 210 describing an exemplary procedure for generating a POK signal. The procedure begins as indicated by start block 212 and flows to operation 214 wherein a precision reference voltage is generated. The procedure then flows to operation 216 wherein the precision reference voltage is divided into a plurality of reference voltages using a series of voltage dividers. Then, in operation 218, one of the plurality of voltages is selected based on a DAC code. The DAC code corresponds to the core voltage requirement of the processor. In one embodiment, the two most significant digits of the DAC code are used to select one of four references voltages generated by the voltage dividers using a 4:1 multiplexer. Other configurations are possible or may be necessary depending on the specifications of the supported processors.

After selecting the reference voltage, the procedure flows to operation 220, wherein the reference voltage is compared with the core voltage to generate a power fail input (PFI) input signal. In one embodiment, the reference voltage is compared with the core voltage using a simple comparator, which outputs the PFI input signal. When the core voltage exceeds the reference voltage, the comparator is connected to a high voltage source, e.g., 3.3 volts, and when the core voltage is less than the reference voltage, the output of the comparator is connected to a low voltage source, e.g., ground.

In operation 222, a POK signal is asserted (driven to a high voltage) after a delay of 200 milliseconds from the time the PFI input signal changes from low to high voltage. After deasserting the POK signal, the procedure ends as indicated by finish block 224.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A power OK (POK) generator comprising:
    a precision reference source generating current at a precision reference voltage, the precision reference source having an op-amp operating in closed loop mode with active circuitry for temperature compensation;
    a plurality of voltage dividers, each of the voltage dividers generating a reference voltage from the precision reference voltage;
    a multiplexer receiving each of the reference voltages, the multiplexer selecting one of the reference voltages based on one or more select signals, the one or more select signals being derived from one or more bits of a digital-to-analog converter (DAC) code, the DAC code defining a selection code for picking a target core voltage, the multiplexer thereby providing a selected reference voltage;
    a comparator receiving the selected reference voltage from the multiplexer and a core voltage provided by a core voltage generator that is distinct from the multiplexer and the DAC code, the comparator outputting power fail input (PFI) signal that indicates whether the core voltage is greater than the selected reference voltage; and
    an output stage circuit receiving the PFI signal and generating a power OK (POK) signal, the POK signal being asserted after a predetermined delay from the time that the PFI signal changes from a low voltage to a high voltage so as to allow the PFI signal to stabilize and to ensure that the high voltage has been reached.

2. The POK generator of claim 1, wherein the precision reference source receives electrical current from a main power rail of a motherboard.

3. The POK generator of claim 1, wherein the series of voltage dividers comprises four voltage dividers and the one or more select signals comprise two select signals representative of two of the bits of the DAC code.

4. The POK generator of claim 1, wherein the PFI signal is high when the core voltage is greater than the selected reference voltage.

5. The POK generator of claim 1, wherein the output stage circuit comprises a supervisor circuit, the supervisor circuit generating the POK signal after the predetermined delay.

6. The POK generator of claim 1, wherein the predetermined delay is 200 milliseconds.

7. The POK generator of claim 1, wherein each of the reference voltages provided by the voltage dividers is selected to be marginally less than the lowest target core voltage that has a corresponding DAC code that causes the multiplexer to select said each of the reference voltages.

8. The POK generator of claim 1, wherein the DAC code comprises at least three bits defining a value, the value being one of a range of possible values, the range of possible values being divided into four segments using two most significant bits of the at least three bits, the two most significant bits defining a value that uniquely identifies one of the four segments, each of the four segments having a range of DAC codes that corresponds to a range of target core voltages.

9. A power OK (POK) generator circuit comprising:
    a precision reference source generating current at a precision reference voltage, the precision reference source having an op-amp operating in closed loop mode with active circuitry for preventing voltage fluctuation;
    a plurality of voltage dividers, each of the voltage dividers generating a reference voltage from the precision reference voltage, the reference voltage representing a distinct one of a plurality of segments, each of the plurality of segments spanning a range of voltage values, the voltage values in the voltage range of a segment supporting distinct voltages that satisfy a variety of core voltage requirements of processors supported by the circuit;
    a multiplexer receiving the reference voltages from each of the plurality of voltage dividers, the multiplexer selecting one of the reference voltages based on one or more select signals derived from one or more bits of a digital-to-analog converter (DAC) code, the DAC code defining a selection code to identify a segment, the reference voltage selected based on identification of segment corresponding to the selection code defined by the one or more bits of the DAC code;
    a comparator receiving the selected reference voltage from the multiplexer and a core voltage provided by a core voltage generator, the comparator outputting power fail input (PFI) signal that indicates whether the core voltage is greater than the selected reference voltage; and
    an output stage circuit receiving the PFI signal and generating a power OK (POK) signal to the corresponding processor identified by the core voltage, the POK signal being asserted after a predetermined delay from the time that the PFI signal changes from a low voltage to a high voltage so as to allow the PFI signal to stabilize and to ensure that the high voltage has been reached.

10. The power OK (POK) generator circuit of claim 9, wherein the number of segments is based on breadth of voltage ranges and desired accuracy needed of the POK signal.

11. The power OK (POK) generator circuit of claim 10, wherein the number of bits of DAC code used in selecting the reference voltage is based on the number of segments, the number of bits used in the selection enabling distinct identification of the reference voltage for the processor.

* * * * *